No. 612,904. Patented Oct. 25, 1898.
T. HÜLSSNER & P. RÖHRIG.
SEWAGE FILTER.
(Application filed Mar. 1, 1898.)
(No Model.)
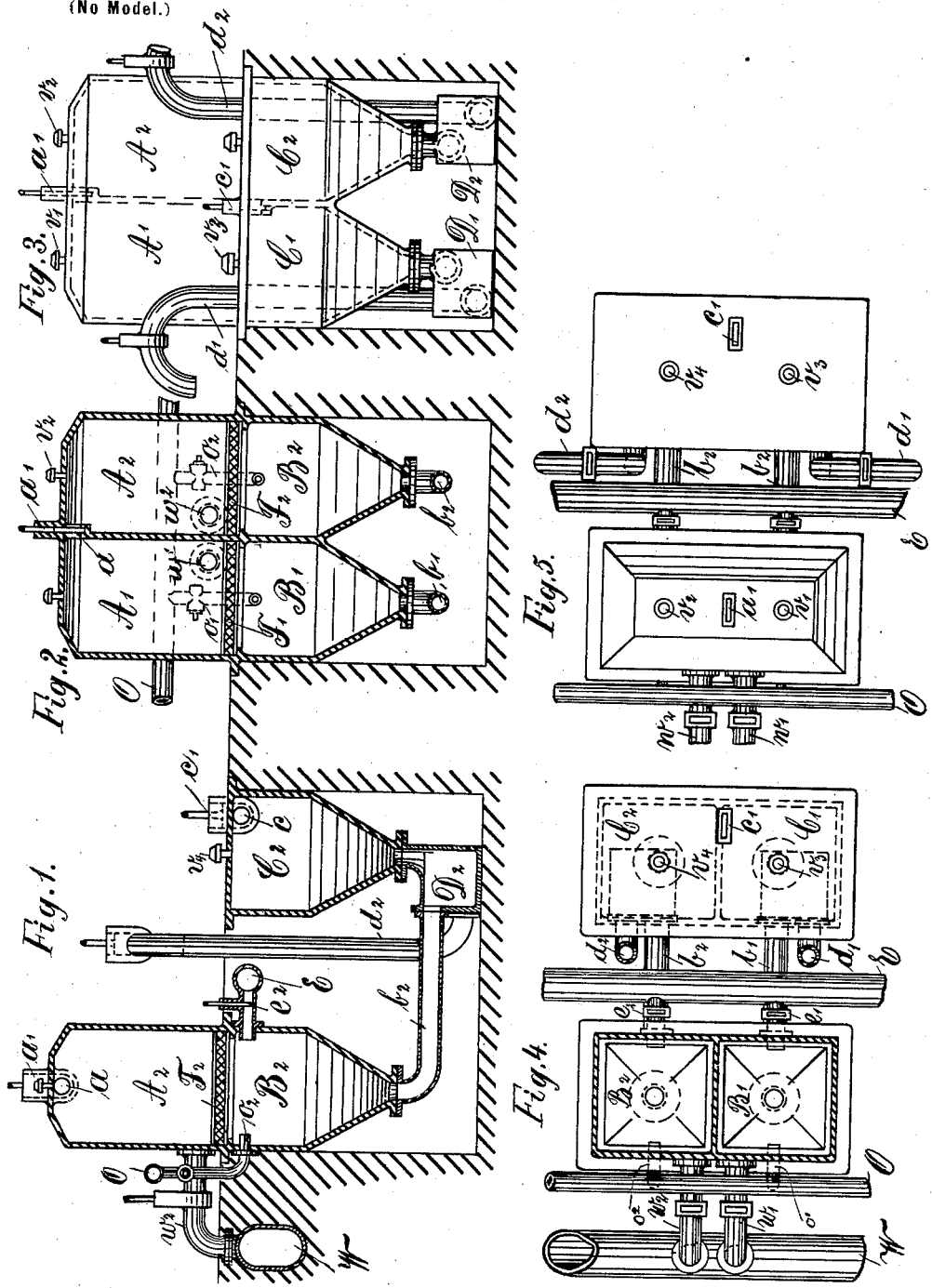
WITNESSES:
Henry Jakobs
Stephan Rössel
INVENTOR:
Theodor Hülssner
and Paul Röhrig.
by Erich Peters
Attorney

UNITED STATES PATENT OFFICE.

THEODOR HÜLSSNER AND PAUL RÖHRIG, OF LEIPSIC, GERMANY.

SEWAGE-FILTER.

SPECIFICATION forming part of Letters Patent No. 612,904, dated October 25, 1898.

Application filed March 1, 1898. Serial No. 672,178. (No model.)

*To all whom it may concern:*

Be it known that we, THEODOR HÜLSSNER and PAUL RÖHRIG, subjects of the King of Saxony, residing at Leipsic, Kingdom of Saxony, Germany, have invented a certain new and useful Sewage-Filter, of which the following is a specification.

The present invention relates to an apparatus consisting of several compartments enabling a permanent discharge of pure water and supply of sewage, thus insuring an uninterrupted service, while the filters are cleaned mechanically, automatically, and continuously.

The apparatus may be composed of any number of chambers which are coöperating in pairs, but which may also be connected by suitable pipes in groups of four, six, or eight chambers.

The accompanying drawings, for example, illustrate a single apparatus of this kind—*i. e.*, Figure 1 is a vertical section of it; Fig. 2, a vertical longitudinal section; Fig. 3, an end view; Fig. 4, a horizontal section through the filter-chamber. Fig. 5 is a plan view of the apparatus.

The apparatus consists of two receptacles, which are divided into two chambers $A'$ $B'$ and $A^2$ $B^2$ by the horizontal filter $F'$ $F^2$, also of two reservoirs $C'$ $C^2$, of which each is respectively connected with the said chambers by a supply-pipe $b'$ $b^2$. From the mains E and O pipes $e'$ $e^2$ and $o'$ $o^2$, which are provided with valves, lead into the lower chambers $B'$ $B^2$, the main E conducting sewage and O conducting oil, petroleum, or benzin.

The lower connection-pipes $b'$ $b^2$ are suitably provided with a box-shaped widening $D'$ $D^2$. From each of these boxes $D'$ $D^2$ a pipe $d'$ $d^2$, also provided with a valve, leads outside. The reservoirs $C'$ $C^2$ are also connected by a pipe $c$ with closure $c'$. The chambers $A'$ $A^2$ above the filters $F'$ $F^2$ are provided with water-discharge pipes $w'$ $w^2$ with valves, which pipes end in a common collecting-pipe W. A communication-hole $a$ in the top part, which can be closed by a valve $a'$, connects the two chambers $A'$ and $A^2$. The chambers $A'$ $A^2$ $C'$ $C^2$ are also provided with air-valves $v'$ $v^2$ $v^3$ $v^4$.

The function of the apparatus is as follows: Through the main E sewage is let into the chamber $B^2$, from where it distributes after opening the air-valves $v^2$ $v^4$ in the chambers $B^2$ $C^2$. The sludge deposits at the lowest places, principally in the box $D^2$. While the water runs in, a certain quantity of oil, petroleum, or the like is let through the main pipe O into chamber $B^2$. After the two lower chambers $B^2$ $C^2$ have become full valve $v^4$ is closed, and the water, still entering through $e^2$, presses the oil swimming in chamber $B^2$ on the sewage through the filter $F^2$, through which the water enters cleaned into the upper chamber $A^2$. Then valve $v^2$ is closed, but pipe $a$ opened by the valve $a'$, also the valves $v'$ and $v^3$. The water in $A^2$ has gradually been filling the chamber $A^2$, the oil has passed into the chamber $A'$ through $a$, run through the filter, loosened the particles of dirt below, at, and in the filter, and penetrated with them into the lower chamber $B'$. The dirt deposited at the bottom and in the box $D^2$ can then be removed by opening the pipe $d^2$ coming from $D^2$. By the pressure of the sewage in E $e^2$ the dirt is pushed outside through the pipe $d^2$. If required, a passage from $C^2$ to $C'$ is established by the communicating pipe $c$. By the open pipe $w^2$ the clean water in chamber $A^2$ passes into the discharge-channel W. Then sewage is let into $B'$ through pipe $e'$, and the same procedure repeats in the other chambers.

The novelty in the employment of this apparatus is the use of oil as a cleaning medium for the filters.

Having now described our invention, what we claim as new, and desire to secure by Letters Patent, is—

1. A filtering apparatus consisting of two pairs of boxes connected with each other, one box of each pair being divided by a horizontal filter in two compartments $A'$, $A^2$, $B'$, $B^2$ of which the lower ones are provided with inlet-pipes $e'$, $e^2$ the sewage, oil-supply pipe O and connecting-pipes $b'$, $b^2$ with sludge-collecting boxes $D'$, $D^2$, sludge-cleaning pipes $d'$, $d^2$ and sludge-depositing boxes $C'$ $C^2$ connected by valve and pipe $c'$ and $c$ with the same part of the other pair, provided with valved discharge-pipes $w'$, $w^2$ to the main collecting-pipe W, with connecting-pipe and valves $a$, $a$ between chambers $A'$ $A^2$, all chambers provided with tightly-coupling air-valves $v'$, $v^2$, $v^3$, $v^4$, and all inlet and outlet pipes provided with tight-closing devices, substantially as and for the purpose set forth.

2. The combination of several filtering apparatus with closed filter-boxes arranged in pairs, with horizontal filters, oil-supply, mutually-connected sludge-depositing boxes and separated sludge-collecting boxes combined into one group by common sewage and oil supply pipes, substantially as and for the purpose set forth.

In witness whereof we have signed this specification in the presence of two witnesses.

THEODOR HÜLSSNER.
PAUL RÖHRIG.

Witnesses:
   RUDOLPH FRICKE,
   ERNST LEGLER.